US008233216B2

(12) United States Patent
Chang et al.

(10) Patent No.: US 8,233,216 B2
(45) Date of Patent: Jul. 31, 2012

(54) OPTICAL AMPLIFIER BANDWIDTH ALTERATION

(75) Inventors: Do-Il Chang, Allen, TX (US); Wayne S. Pelouch, McKinney, TX (US); Herve A. Fevrier, Plano, TX (US)

(73) Assignee: Xtera Communications, Inc., Allen, TX (US)

( * ) Notice: Subject to any disclaimer, the term of this patent is extended or adjusted under 35 U.S.C. 154(b) by 402 days.

(21) Appl. No.: 12/350,067

(22) Filed: Jan. 7, 2009

(65) Prior Publication Data
US 2009/0174932 A1    Jul. 9, 2009

Related U.S. Application Data

(60) Provisional application No. 61/019,577, filed on Jan. 7, 2008, provisional application No. 61/019,574, filed on Jan. 7, 2008, provisional application No. 61/019,467, filed on Jan. 7, 2008.

(51) Int. Cl.
*H04B 10/17* (2006.01)
*H01S 3/30* (2006.01)
*H04B 10/12* (2006.01)

(52) U.S. Cl. ............... 359/341.31; 359/334; 359/341.3; 359/341.32

(58) Field of Classification Search ............. 359/334, 359/341.3, 341.31, 341.32
See application file for complete search history.

(56) References Cited

U.S. PATENT DOCUMENTS

| | | | |
|---|---|---|---|
| 5,710,659 A | 1/1998 | Cline | |
| 6,359,728 B1 | 3/2002 | Angellieri et al. | |
| 6,456,426 B1 | 9/2002 | Bolshtyansky et al. | |
| 6,611,368 B1* | 8/2003 | Grant et al. | 359/334 |
| 6,748,136 B2* | 6/2004 | Headley et al. | 385/27 |
| 6,813,067 B1* | 11/2004 | Birk et al. | 359/334 |
| 7,046,427 B1* | 5/2006 | Birk et al. | 359/334 |
| 7,116,470 B2* | 10/2006 | Martinelli et al. | 359/334 |
| 7,212,333 B2* | 5/2007 | Sugaya | 359/334 |
| 7,379,233 B2* | 5/2008 | Nakamoto et al. | 359/334 |
| 2003/0035202 A1 | 2/2003 | Islam et al. | |
| 2003/0053192 A1 | 3/2003 | Islam et al. | |
| 2003/0053507 A1 | 3/2003 | Islam et al. | |
| 2004/0091003 A1 | 5/2004 | Ogiwara et al. | |
| 2004/0240038 A1* | 12/2004 | Kado et al. | 359/334 |

* cited by examiner

*Primary Examiner* — Eric Bolda
(74) *Attorney, Agent, or Firm* — James Harlan

(57) ABSTRACT

The alteration of the bandwidth of an optical amplifier. Before alteration, optical signals having a first set of wavelengths are provided through a gain medium of the optical amplifier. In addition, a first pump having a set of pump wavelengths is propagated through the gain medium to thereby amplify the optical signals. After alteration, optical signals having at least a partially different set of wavelengths are able to be optically amplified by coupling a second pump into the optical medium. The second pump is at least partially distinct from the first pump in that the second pump includes at least one pump wavelength that was not included in the first pump.

23 Claims, 13 Drawing Sheets

OPTICAL AMPLIFIER BANDWIDTH ALTERATION

CROSS-REFERENCE TO RELATED APPLICATIONS

This application claims benefit under 35 U.S.C. §119(e) of U.S. Provisional Application Ser. No. 61/019,577, entitled "SYSTEM AND METHOD FOR EXPANDING THE BANDWIDTH OF AN OPTICAL AMPLIFIER", filed Jan. 7, 2008, by DO-IL Chang et al. This application also claims benefit under 35 U.S.C. §119(e) of U.S. Provisional Application Ser. No. 61/019,574, entitled "EFFICIENT DISCRETE AMPLIFICATION", filed Jan. 7, 2008, by DO-IL Chang et al. This application claims benefit under 35 U.S.C. §119(e) of U.S. Provisional Application Ser. No. 61/019,467, entitled "OPTICAL AMPLIFIER CAPABLE OF AMPLIFYING OPTICAL SIGNALS THAT TRAVERSE SEPARATE TRANSMISSION FIBERS", filed Jan. 7, 2008, by Wayne S. Pelouch et al.

BACKGROUND

Conventional optical communication systems typically implement one or more discrete in-line amplifiers to amplify an optical communication signal as it traverses a communication span or transmission fiber. Due to the relatively high cost of an optical amplifier, the expense of optical communication systems can be a barrier to entry into the communications market. In some cases, a company may desire installation of a system having only a relatively limited bandwidth that is sufficient to satisfy the present needs of a company at lower cost. The downside to this approach is that, in conventional systems, when the company desires to expand its bandwidth to handle additional traffic, the expansion can be expensive. This expense may arise because bandwidth expansion typically requires replacement of the optical amplifiers or additional optical amplifiers to support the increased bandwidth.

BRIEF SUMMARY

Embodiments described herein relate to the alteration of the bandwidth of an optical amplifier. Before alteration, optical signals having a first set of wavelengths are provided through a gain medium of the optical amplifier. In addition, a first pump having a set of pump wavelengths is propagated through the gain medium to thereby amplify the optical signals. After alteration, optical signals having at least a partially different set of wavelengths are able to be optically amplified by coupling a second pump into the optical medium. The second pump is at least partially distinct from the first pump in that the second pump includes at least one pump wavelength that was not included in the first pump. In one embodiment, the alteration of bandwidth is an expansion of bandwidth, and the first and second pumps are used after expansion to amplify additional wavelength channels of the optical signal. Although not required, the optical amplification may be Raman amplification.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

Particular examples and values (such as dimensions and wavelengths) specified throughout this document are for illustrative purposes only, and are not intended to limit the scope of the present disclosure. In particular, this disclosure is not limited to any particular type of optical communication system. The teachings of the present disclosure may be used in any optical communication system where it is desired to expand the bandwidth of an existing amplification scheme. Moreover, the illustrations in FIGS. 1 through 11b are not intended to be to scale.

Figure 1:
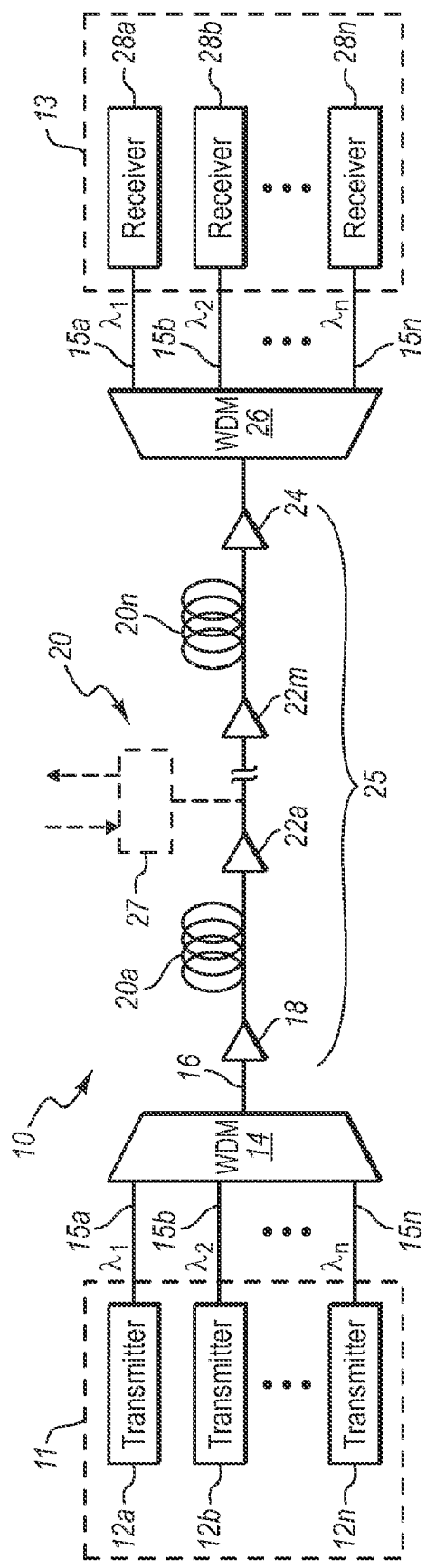
FIG. 1 illustrates a block diagram showing at least a portion of an optical communication system operable to facilitate communication of one or more multiple wavelength signals.

FIG. 1 is a block diagram showing at least a portion of an example optical communication system 10 operable to facilitate communication of one or more multiple wavelength signals 16. In some embodiments, system 10 may comprise the entire optical communication system. In other embodiments, system 10 may comprise a portion of a larger optical communication system.

In this example, system 10 includes a plurality of transmitters 12a-12n operable to generate a plurality of optical signals (or channels) 15a-15n, each comprising a center wavelength of light. In some embodiments, each optical channel 15 comprises a center wavelength that is substantially different from the center wavelengths of other channels 15. As used throughout this document, the term "center wavelength" refers to a time-averaged mean of the spectral distribution of an optical signal. The spectrum surrounding the center wavelength need not be symmetric about the center wavelength. Moreover, there is no requirement that the center wavelength represent a carrier wavelength. Transmitters 12 can comprise any device capable of generating one or more optical channels. Transmitters 12 can comprise externally modulated light sources, or can comprise directly modulated light sources.

In one embodiment, transmitters 12 comprise one or a plurality of independent light sources each having an associated modulator, with each source being operable to generate one or more optical channels 15. Alternatively, transmitters 12 could comprise one or more light sources shared by a plurality of modulators. For example, transmitters 12 could comprise a continuum source transmitter operable to generate a multitude of optical signals. In that embodiment, a signal splitter receives the continuum and separates the continuum into individual channels each having a center wavelength. In some embodiments, transmitters 12 can also include a pulse rate multiplexer, such as a time division multiplexer, operable to multiplex pulses received from a mode locked source or a modulator to increase the bit rate of the system.

Transmitters 12, in some cases, may comprise a portion of an optical regenerator. That is, transmitters 12 may generate optical channels 15 based on electrical representations of electrical or optical channels received from other optical communication links. In other cases, transmitters 12 may generate optical channels 15 based on information received from sources residing locally to transmitters 12. Transmitters 12 could also comprise a portion of a transponder assembly (not explicitly shown), containing a plurality of transmitters and a plurality of receivers.

In various embodiments, transmitters 12 may include a forward error correction (FEC) encoder/decoder module capable improving the Q-factor of channels 15 and the bit-error rate of system 10. For example, the FEC module may encode an FEC sequence, such as, Reed Solomon coding, Turbo Product Codes coding, Concatenated Reed-Solomon coding, or other algorithms capable of improving the Q-factor of channels 15 and the bit error rate of system 10. As used throughout this document, the term "Q-factor" refers to a metric for determining the quality of the signal communicated from a transmitter. The "Q-factor" associated with optical channels 15 communicated from transmitters 12 refers to the difference of the mean value of the high signal values ($M_H$) and the mean value of the low signal values ($M_L$) associated with an optical signal over the sum of the standard deviation of the multiple highs ($\Delta_H$) and the multiple lows $\Delta_L$). The value of the Q-factor can be expressed in $dB_{20}$. In equation form, this relationship is expressed as:

$$Q = [M_H - M_L] \div [\Delta_H + \Delta_L]$$

In some cases, multiple wavelength signals 16 can carry wavelength signals 15a-15n ranging across a relatively wide bandwidth. In some implementations, wavelength signals 15a-15n may even range across different communications bands (e.g., the short band (S-band), the conventional band (C-band), and/or the long band (L-band)).

In the illustrated embodiment, system 10 also includes combiners 14 operable to receive optical channels 15a-15n, and to combine those signals into multiple wavelength channels 16. As one particular example, combiners 14 could comprise a wavelength division multiplexer (WDM). The terms wavelength division multiplexer and wavelength division demultiplexer as used herein may include equipment operable to process wavelength division multiplexed signals and/or equipment operable to process dense wavelength division multiplexed signals.

System 10 communicates multiple wavelength signal 16 over optical communication spans 20a-20n. Communication span 20 can comprise, for example, standard single mode fiber (SMF), dispersion shifted fiber (DSF), non-zero dispersion shifted fiber (NZDSF), dispersion compensating fiber (DCF), pure-silica core fiber (PSCF), or another fiber type or combination of fiber types. In various embodiments, span 20a-20n can comprise any span length. In some embodiments, communication span 20 could comprise, for example, a unidirectional span or a bi-directional span. Span 20 could comprise a point-to-point communication link, or could comprise a portion of a larger communication network, such as a ring network, a mesh network, a star network, or any other network configuration. For example, communication span 20 could comprise one span or link of a multiple link system, where each link couples to other links through, for example, optical regenerators or wavelength selective switches. A link refers to a group of one or more spans with optical communication between two points through the spans.

One or more spans of communication medium 20 can collectively form an optical link. In the illustrated example, communication media 20 includes a single optical link 25, respectively, comprising numerous spans 20a-20n. System 10 could include any number of additional links coupled to links 25. For example, optical link 25 could comprise one optical link of a multiple link system, where each link is coupled to other links through, for example, optical regenerators or wavelength selective switches.

Optical link 25 could comprise point-to-point communication links, or could comprise a portion of a larger communication network, such as a ring network, a mesh network, a star network, or any other network configuration.

System 10 may further include one or more access elements 27. For example, access elements 27 could comprise an add/drop multiplexer, a cross connect, or another device operable to terminate, cross connect, switch, route, process, and/or provide access to and from optical link 25 and another optical link or communication device. System 10 may also include one or more lossy elements (not explicitly shown) and/or gain elements capable of at least partially compensating for the lossy element coupled between spans 20 of link 25. For example, the lossy element could comprise a signal separator, a signal combiner, an isolator, a dispersion compensating element, a circulator, or a gain equalizer.

In this embodiment, separators 26 separates individual optical signals 15a-15n from multiple wavelength signals 16 received at the end of link 25. Separator 26 may comprise, for example, a wavelength division demultiplexer (WDM). Separator 26 communicates individual signal wavelengths or ranges of wavelengths to a bank of receivers 28 and/or other optical communication paths. One or more of receivers 28 may comprise a portion of an optical transceiver operable to receive and convert signals between optical and electrical formats.

In the illustrated embodiment, transmitters 12 and receivers 28 reside within terminals 11 and 13, respectively. Terminals 11 and 13 can include both transmitters and receivers without departing from the scope of the present disclosure. Additionally, terminals 11 and 13 may include any other optical component, such as, combiner 14, booster amplifier 18, pre-amplifier 24, and/or separator 26 without departing from the scope of the present disclosure. In some cases, terminals 11 and 13 can be referred to as end terminals. The phrase "end terminal" refers to devices operable to perform optical-to-electrical and/or electrical-to-optical signal conversion and/or generation.

System 10 includes a plurality of optical amplifiers coupled to communication span 20. In this example, system 10 includes booster amplifier 18 operable to receive and amplify wavelengths of signals 16 in preparation for transmission over communication span 20. Where communication system 10 includes a plurality of fiber spans 20a-20n, system 10 can also include one or more in line amplifiers 22a-22m with or without co-propagating and/or counter-propagating (relative to the signal direction) distributed Raman amplification. In line amplifiers 22 couple to one or more spans 20a-20n and operate to amplify signals 16 as they traverse communication span 20. The illustrated example also implements a preamplifier 24 operable to amplify signals 16b received from final fiber span 20n prior to communicating signals 16 to separator 26. Although optical link 25 is shown to include one or more booster amplifiers 18 and preamplifiers 24, one or more of the amplifier types could be eliminated in other embodiments.

Amplifiers 18, 22, and 24 could each comprise, for example, one or more stages of discrete Raman amplification stages, distributed Raman amplification stages, rare-earth-doped amplification stages, such as erbium-doped or thulium-doped stages, semiconductor amplification stages or a combination of these or other amplification stage types. Throughout this document, the term "amplifier" denotes a device or combination of devices operable to at least partially compensate for at least some of the losses incurred by signals while traversing all or a portion of optical link 25. Likewise, the terms "amplify" and "amplification" refers to offsetting at least a portion of losses that would otherwise be incurred.

An amplifier may, or may not impart a net gain to a signal being amplified. Moreover, the terms "gain" and "amplify" as used throughout this document do not (unless explicitly specified) require a net gain. In other words, it is not necessary that a signal experiencing "gain" or "amplification" in an amplifier stage experience enough gain to overcome all losses in the amplifier stage or in the fiber connected to the amplifier stage. As a specific example, distributed Raman amplifier stages often do not experience enough gain to offset all of the losses in the transmission fiber that serves as a gain medium. Nevertheless, these devices are considered "amplifiers" because they offset at least a portion of the losses experienced in a transmission fiber.

Depending on the amplifier types chosen, one or more of amplifiers 18, 22, and/or 24 could comprise a wide band amplifier operable to amplify all signal wavelengths 15a-15n received. Alternatively, one or more of those amplifiers could comprise a parallel combination of narrower band amplifier assemblies, wherein each amplifier in the parallel combination is operable to amplify a portion of the wavelengths of multiple wavelength signals 16. In that case, system 10 could incorporate signal separators and/or signal combiners surrounding the parallel combinations of amplifier assemblies to facilitate amplification of a plurality of groups of wavelengths for separating and/or combining or recombining the wavelengths for communication through system 10.

In this or other embodiments, system 10 may implement one or more dispersion management techniques to compensate for dispersion of signals 16. For example, system 10 can implement a pre-compensation, in-line compensation, and/or a post-compensation technique. These dispersion compensation techniques can include, for example, electronic dispersion compensation techniques, optical dispersion compensation techniques, or any other appropriate dispersion compensation technique. In various embodiments, terminals 11 and 13 can include one or more dispersion compensating elements capable of at least partially compensating for chromatic dispersion associated with signals 16. In some embodiments, the dispersion compensating element can comprise a dispersion length product that approximately compensates for the dispersion accumulated by optical signals 16 while traversing span 20 of system 10. In other embodiments, at least a portion of a gain medium of amplifier 24 may comprise a dispersion compensating fiber that is capable of at least partially compensating for chromatic dispersion associated with signals 16. In those embodiments, the dispersion compensating fiber can comprise a slope of dispersion that is equal to and opposite from the slope of chromatic dispersion associated with multiple wavelength signals 16 in spans 20.

In certain embodiments, the bandwidth of system 10 can be expanded by adding one or more pump sources to amplifiers 18, 22, and/or 24. The pump source can comprise any device or combination of devices capable of generating one or more pump wavelengths at desired power levels and wavelengths. For example, the pump source can comprise a solid state laser, such a Nd:YAG or Nd:YLF laser, a semiconductor laser, a laser diode, a cladding-pumped fiber laser, or any combination of these or other light sources.

In those embodiments, each of the pump sources may be capable of generating one or more pump wavelengths. The pumps can each comprise one or more pump wavelengths, each of the one or more pump wavelengths comprising a center wavelength of light. In some embodiments, each of the one or more pump wavelengths within a particular pump can comprise a center wavelength that is substantially different from the center wavelengths of the other pump wavelengths within the particular pump. The new pump wavelengths may be shorter, longer, or interspersed with the original (or "core") pump wavelengths.

In some embodiments, the new pumps can co-propagate through span 20 in relation to signal 16. In other embodiments, the new pumps can counter-propagate through span 20 in relation to optical signal 16. In yet other embodiments, some of the new pumps can co-propagate through span 20 in relation to signal 16, while other new pumps can counter-propagate through span 20. As used throughout this document, the term "co-propagates" or "co-propagating" refers to a condition where, for at least some time at least a portion of the pump propagates through the gain medium in the same direction as at least one wavelength of the optical signal being amplified. In addition, the term "counter-propagates" or "counter-propagating" refers to a condition where at least a portion of a pump propagates through a gain medium of an optical device in a direction counter to the direction of the optical signal being amplified.

One aspect of this disclosure recognizes that the bandwidth of one or more of amplifier 18, 22, and 24 can be advantageously expanded by adding at least one new pump wavelength that is shorter than the longest core pump wavelength. Another aspect of this disclosure presents an algorithm for bandwidth expansion in which the signal power ripple and noise figure is minimally degraded as the bandwidth of the amplifier is increased from the minimum to the maximum value. A further advantage of this disclosure is that the pump power is minimized for the minimum-bandwidth configuration, thus lowering initial installed cost. Another aspect of this disclosure recognizes that adding the new pump wavelengths on the opposite side of the gain spool as the core pumps may allow more flexibility in wavelength selection since this creates two pump multiplexer sections, which are not dependent on each other. This pump expansion can be accomplished with a number of different pump configurations, as described in further detail below.

Figure 2:
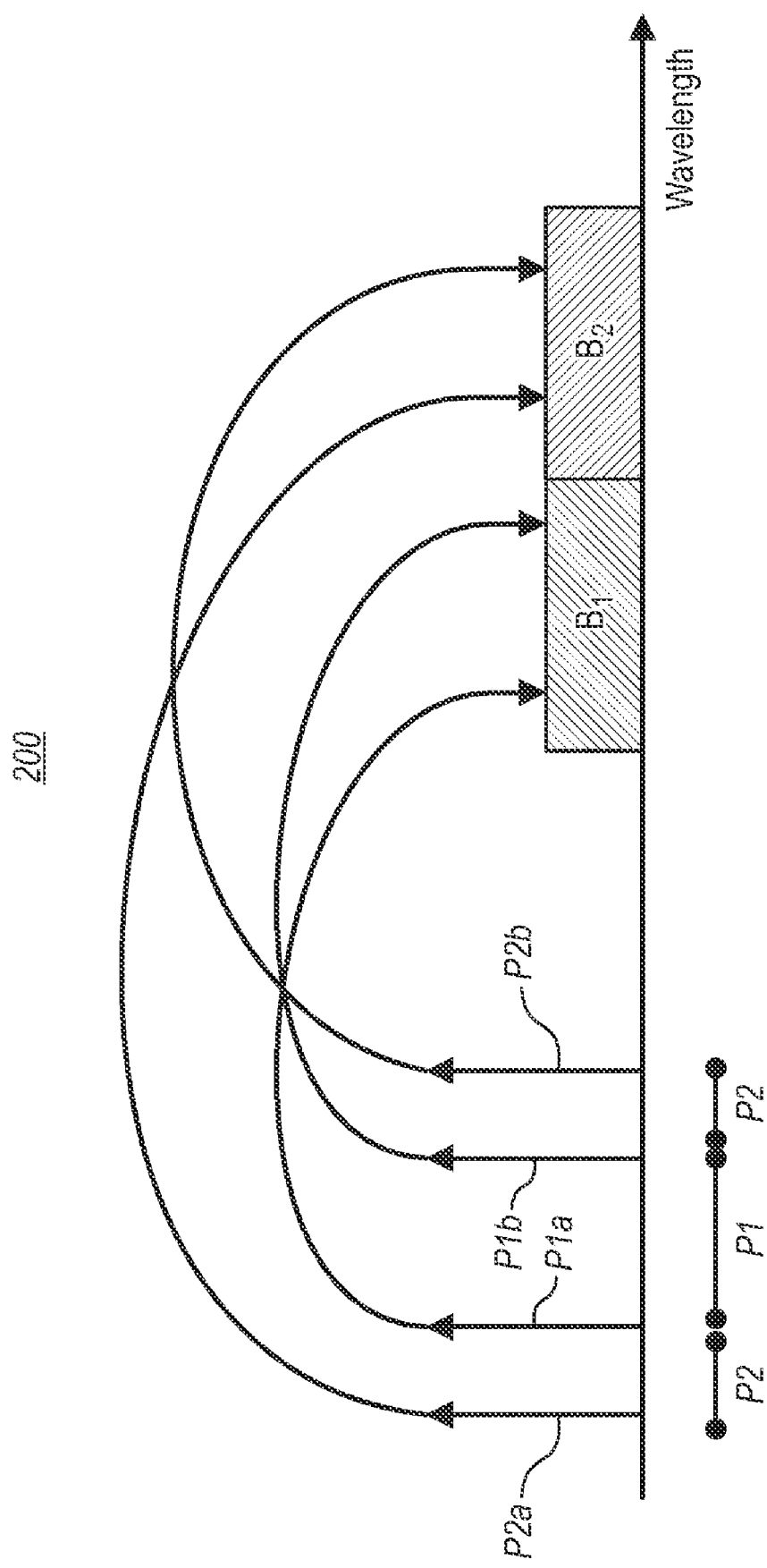
FIG. 2 is an optical pump and signal wavelength schema for an optical amplifier whose amplification bandwidth has been expanded.

FIG. 2 is an optical pump and signal wavelength schema for an optical amplifier 200 whose amplification bandwidth has been expanded. The optical amplifier 200 can be substantially similar in structure and function to amplifiers 18, 22, and/or 24 of FIG. 1. The particular wavelengths and/or combinations of wavelengths illustrated in FIG. 2 is intended for illustrative purposes only and is not intended to limit the scope of the present disclosure. It should be appreciated that other embodiments or combinations of wavelengths may be used without departing from the scope of the present disclosure.

In this example, amplifier 200 comprises a discrete or distributed Raman amplifier capable of amplifying one or more optical signals in Bandwidth B1. Although amplifier 200 in this example includes a Raman amplifier, any other optical amplifier can be used without departing from the scope of the present disclosure. For example, amplifier 200 could comprise a multi-stage discrete amplifier having one or more rare-earth-doped amplification stage and one or more Raman amplification stages. System 200 also includes a first pump source that generates one or more pumps P1 for introduction to the Raman gain fiber of amplifier 200. Although FIG. 2 illustrates two pumps P1, one or any number of pumps could be used without departing from the scope of the present disclosure.

In this example, it is desired to expand the amplification bandwidth of amplifier 200 to include new amplification bandwidth B2. Thus, amplifier assembly 200 also includes a new second pump source that generates one or more pumps P2 for introduction to the Raman gain fiber of amplifier 200. Although FIG. 2 illustrates two pumps P2, one or any number of pumps could be used without departing from the scope of the present disclosure. In this particular embodiment, new pump wavelengths P2 are introduced to the Raman gain medium of amplifier 200 by introducing at least one pump wavelength P2$a$ that is shorter than the shortest wavelength of P1 (indicated by P1$a$). Optionally, a pump wavelength P2$b$ that is longer than the longest wavelength of P1 (indicated by P1$b$) can be added.

In this particular embodiment, the additional amplification bandwidth B2 comprises a plurality of wavelengths longer than the wavelengths in bandwidth B1. In other embodiments, the additional amplification bandwidth could comprise a plurality of wavelengths shorter than the wavelengths in bandwidth B1. In some embodiments, the additional amplification bandwidth B2 could comprise a plurality of wavelengths longer than the wavelengths in bandwidth B1 and a plurality of wavelengths shorter than wavelengths in bandwidth B1.

In various embodiments, the exact configuration of pumps could depend on an optimization algorithm, involving factors such as achieving low noise figures, minimizing channel power ripple, and minimizing pump power. Further, it may be necessary in certain embodiments to switch off some pump wavelengths during bandwidth expansion in order to satisfy one of the above optimization factors or any other optimization factor.

Figure 3:
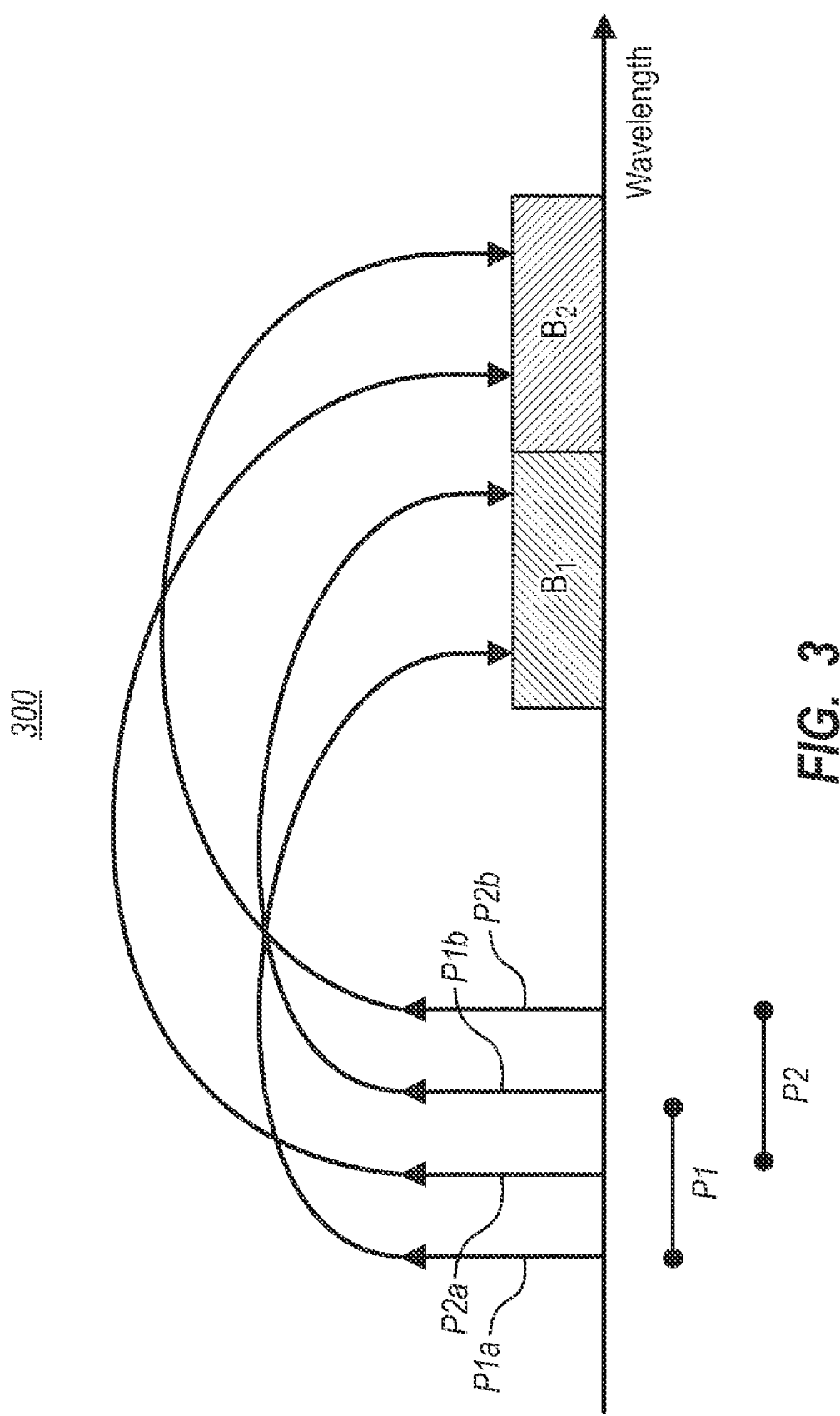
FIG. 3 is an optical pump and signal wavelength schema for an optical amplifier whose amplification bandwidth has been expanded.

FIG. 3 is an optical pump and signal wavelength schema for an optical amplifier 300 whose amplification bandwidth has been expanded. The optical amplifier 300 can be substantially similar in structure and function to amplifiers 18, 22, and/or 24 of FIG. 1. The particular wavelengths and/or combinations of wavelengths illustrated in FIG. 3 is intended for illustrative purposes only and is not intended to limit the scope of the present disclosure. It should be appreciated that other embodiments or combinations of wavelengths may be used without departing from the scope of the present disclosure.

In this example, amplifier 300 comprises a discrete or distributed Raman amplifier capable of amplifying one or more optical signals in Bandwidth B1. Although amplifier 300 in this example includes a Raman amplifier, any other optical amplifier can be used without departing from the scope of the present disclosure. For example, amplifier 300 could comprise a multi-stage discrete amplifier having one or more rare-earth-doped amplification stage and one or more Raman amplification stages. System 300 also includes a first pump source that generates one or more pumps P1 for introduction to the Raman gain fiber of amplifier 300. Although FIG. 3 illustrates two pumps P1, any number of pumps could be used without departing from the scope of the present disclosure.

In this example, it is desired to expand the amplification bandwidth of amplifier 300 to include new amplification bandwidth B2. Thus, amplifier assembly 300 also includes a new second pump source that generates one or more pumps P2 for introduction to the Raman gain fiber of amplifier 300. Although FIG. 300 illustrates two pumps P2, one or any number of pumps could be used without departing from the scope of the present disclosure. In this particular embodiment, new pump wavelength P2 are introduced to the Raman gain medium of amplifier 300 by introducing at least one pump wavelength P2$a$ that is in between the shortest pump wavelength of P1 (indicated by P1$a$) and the longest pump wavelength of P1 (indicated by P1$b$). Optionally, a pump wavelength P2$b$ that is longer than the longest pump wavelength P1$b$ can be added.

In this particular embodiment, the additional amplification bandwidth B2 comprises a plurality of wavelengths longer than the wavelengths in bandwidth B1. In other embodiments, the additional amplification bandwidth could comprise a plurality of wavelengths shorter than the wavelengths in bandwidth B1. In some embodiments, the additional amplification bandwidth B2 could comprise a plurality of wavelengths longer than the wavelengths in bandwidth B1 and a plurality of wavelengths shorter than wavelengths in bandwidth B1.

In various embodiments, the exact configuration of pumps could depend on an optimization algorithm, involving factors such as achieving low noise figures, minimizing channel power ripple, and minimizing pump power. Further, it may be necessary in certain embodiments to switch off some pump wavelengths during bandwidth expansion in order to satisfy one of the above optimization factors or any other optimization factor.

Figure 4:
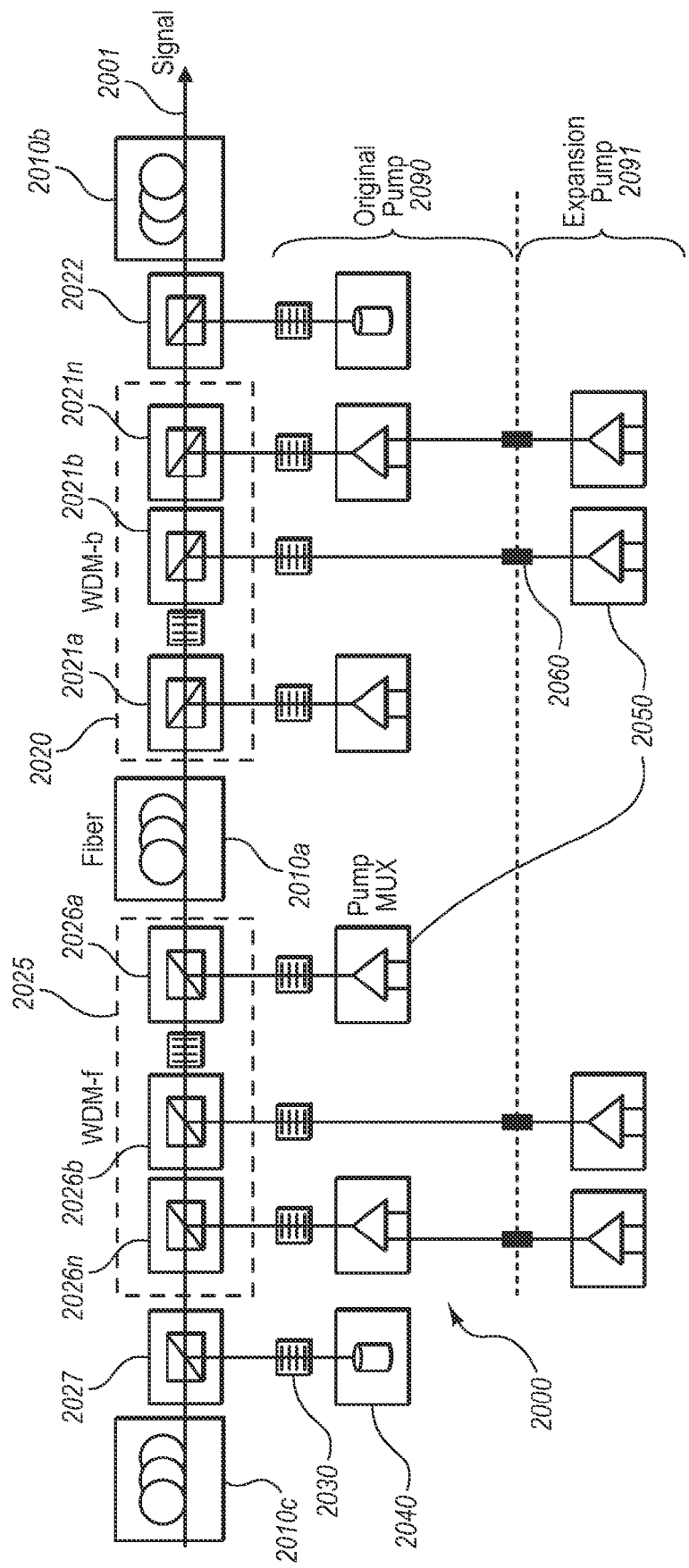
FIG. 4 illustrates a block diagram showing at least a portion of an optical amplifier capable of having its bandwidth expanded.

FIG. 4 is a block diagram showing at least a portion of an optical amplifier 2000 capable of having its bandwidth expanded. The optical amplifier 2000 can be substantially similar in structure and function to amplifiers 18, 22, and/or 24 of FIG. 1. FIG. 4 shows one example of the means by which expansion pumps 2091 may be added to the optical amplifier 2000 and shows one example of how the expansion pumps 2091 may be used to expand the bandwidth of the optical amplifier 2000.

Amplifier 2000 comprises at least one fiber unit 2010$a$. Optionally, fiber units 2010$b$ and/or 2010$c$ may interact with expansion pumps 2091 or in some embodiments may be removed. Fiber units 2010 are further depicted in FIG. 7. Amplifier 2000 comprises at least one WDM unit in either the backward direction (WDM-b) 2020 which is positioned after fiber unit 2010$a$ and/or in the forward direction (WDM-f) 2025 which is positioned before fiber unit 2010$a$. The term forward and backward are relative to the signal direction 2001. Each WDM unit 2020 and/or 2025 further comprises at least one WDM function 2021 and/or 2026, respectively. WDM functions are further depicted in FIG. 6. Each WDM function 2021 and/or 2026 receives the output of pump multiplexer (mux) function 2050, which is further depicted in FIG. 5. Optical amplifier 2000 has at least one pump mux function 2050 within the original pump mux section 2090 and optionally may add at least one pump mux function 2050 from the expansion pump section 2091. The expansion pump section 2091 depicts pumps that may be added to optical amplifier 2000 in order to expand the bandwidth of optical amplifier 2000. Pump mux function 2050 is further depicted in FIG. 5. The other depicted components and functions are optional in certain embodiments, including pump reflector 2030, pump demultiplexer (dmux) 2027, pump dmux 2022, pump terminator 2040, and expansion pump connector 2060. The position of WDM-b functions 2021 and optional pump reflector 2030 within WDM-b unit 2020 can be in any order with respect to the signal path 2001 along with their dependent pump mux 2050 inputs. The position of WDM-f functions 2026 and optional pump reflector 2030 within WDM-f unit 2025 can be in any order with respect to the signal path 2001 along with their dependent pump mux 2050 inputs. Pump mux 2050 in the expansion pump section 2091 may connect directly to WDM functions 2021 and/or 2026 or may connect to other pump mux function 2050 within the original pump section 2090. Optional pump dmux 2027 is located before WDM-f unit 2025 and may be located before fiber unit 2010c (which may allow one or more backward pumps to travel through fiber unit 2010c) or after fiber unit 2010c. Optional pump dmux 2022 is located after WDM-b unit 2020 and may be located before fiber unit 2010b or after fiber unit 2010b (which may allow one or more forward pumps to travel through fiber unit 2010b). Expansion pump mux 2050 in section 2091 (expansion pumps) may be attached to optical amplifier 2000 through optional optical connectors 2060 or by other means.

It should be noted in the following example description of expansion pump paths that WDM-f is optional if WDM-b exists and that WDM-b is optional if WDM-f exists, or both WDM-b and WDM-f may be used. In the following example, the one or more pump mux 2050 in original pump mux section 2090 may attach to either WDM-b and/or WDM-F, independent of the location of pump mux 2050 in expansion pump section 2091.

Expansion pumps that eventually connect to WDM-b unit may travel backward with respect to signal direction 2001 through fiber unit 2010a, and potentially: (1) pass through optional WDM-f unit, or (2) reflect off of optional pump reflector 2030 within WDM-f or couple through any optional WDM-f function 2026 (towards dependent pump mux 2050), whose path may contain a pump reflector 2030 capable of reflecting one or more expansion pump wavelengths. The reflected expansion pumps then, if applicable, could be directed forward into fiber unit 2010a. If route (1) was taken above, then the expansion pumps (3) may further be directed by optional pump dmux 2027 into optional pump reflector 2030 capable of reflecting one or more expansion pump wavelengths. The reflected expansion pumps then, if applicable, would be directed forward into fiber unit 2010a, or (4) may travel through optional fiber unit 2010c, or (5) may travel through optional fiber unit 2010c and then may be directed by optional pump dmux 2027 into optional pump reflector 2030 capable of reflecting one or more expansion pump wavelengths. The reflected expansion pumps then, if applicable, would be directed back through fiber unit 2010c in the forward direction, through optional WDM-F, and be directed forward into fiber unit 2010a. Thus, expansion pumps from WDM-b may travel backward through fiber unit 2010a, optionally travel backward through fiber unit 2010c, and/or optionally be reflected in the forward direction to pass through either fiber unit 2010a or both fiber units 2010c and 2010a. Expansion pumps from WDM-b that were reflected into the forward direction and pass through fiber unit 2010a in the forward direction may either (1) retrace their path back into pump mux 2050 (potentially terminating at an isolator), or (2) if the WDM function 2021 that expansion pumps are coupled to is a circulator 2221b of FIG. 6 and is the last WDM-b function 2021n with respect to signal direction 2001, then expansion pumps will continue to travel in the forward direction and either (2a) be directed from pump dmux 2022 into pump terminator 2040, or (2b) travel forward through optional fiber unit 2010b in which case one or more expansion pump wavelengths may further reflect off of optional pump dmux 2022 and pump reflector 2030 after fiber unit 2010b into the backward direction into fiber unit 2010b and eventually terminate in said circulator. Thus, expansion pumps from WDM-b that were reflected into the forward direction and passed through fiber unit 2010a in the forward direction may pass through optional fiber unit 2010b, and optionally be reflected in the backward direction through fiber unit 2010b.

Expansion pumps that eventually connect to WDM-f unit may travel forward with respect to signal direction 2001 through fiber unit 2010a. The expansion pumps may take the symmetric paths discussed in the preceding paragraph, noting that the functions and components of optical amplifier 2000 are symmetric from fiber unit 2010a with respect to signal direction 2001 except for the circulator. Thus, expansion pumps from WDM-f will travel forward through fiber unit 2010a, optionally travel forward through fiber unit 2010b, and/or optionally be reflected in the backward direction to pass through either fiber unit 2010a or both fiber units 2010b and 2010a.

It is understood that any combination of alternative components that perform substantially similar functions as those depicted in FIG. 4 may be substituted with those of FIG. 4 without departing from the scope of the present disclosure. As one example, pump dmux 2022 and pump reflector 2030 below pump dmux 2022 may be substituted with a pump FBG reflector in the signal path.

Figure 5:
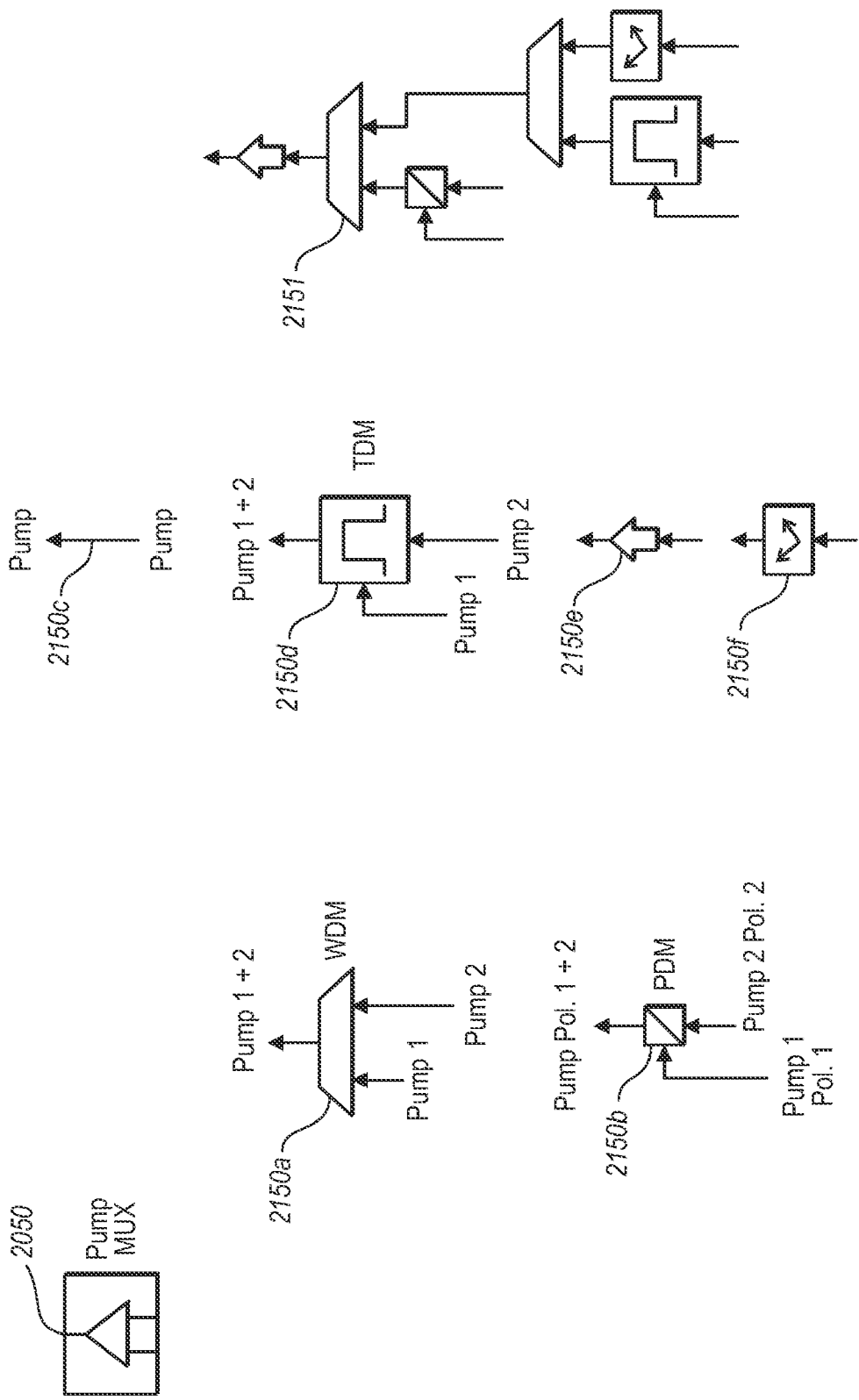
FIGS. 5-7 illustrate embodiments of components and/or functions depicted in FIG. 4.

FIG. 5 depicts some example embodiments of pump mux function 2050 of FIG. 4. Pump mux function 2050 has an input of one or more pump wavelengths and/or one or more groups of pump wavelengths, potentially from other pump mux functions 2050. Pump mux function 2050 may comprise a wavelength division multiplexer (WDM) 2150a which combines pump1 and pump2 into one output, where pump1 and pump2 are one or more pump wavelengths; a polarization division multiplexer (PDM) 2150b which combines pump1 of polarization 1 and pump2 of polarization 2 into one output, where pump1 and pump2 are one or more pump wavelengths; a time division multiplexer (TDM) 2150d which combines pump1 of one pulsed format and pump2 of another pulsed format into one output, where pump1 and pump2 are one or more pump wavelengths; a piece of optical fiber 2150c that transmits pump; an optical isolator 2150e that protects pump transmitter from back-reflections; and/or a depolarizer 2150f that reduces the degree of polarization of the pump. It is understood that any combination of the components 2150 and similar components known to those skilled in the art may be combined to perform pump mux function 2050, an example of which is pump mux combination 2151 which has five pump inputs of one or more pump wavelengths and one pump output that multiplexes the inputs. It is understood that in certain embodiments other mux components may have more than two inputs. Pump wavelengths are added at the input of the pump mux 2050.

Figure 6:
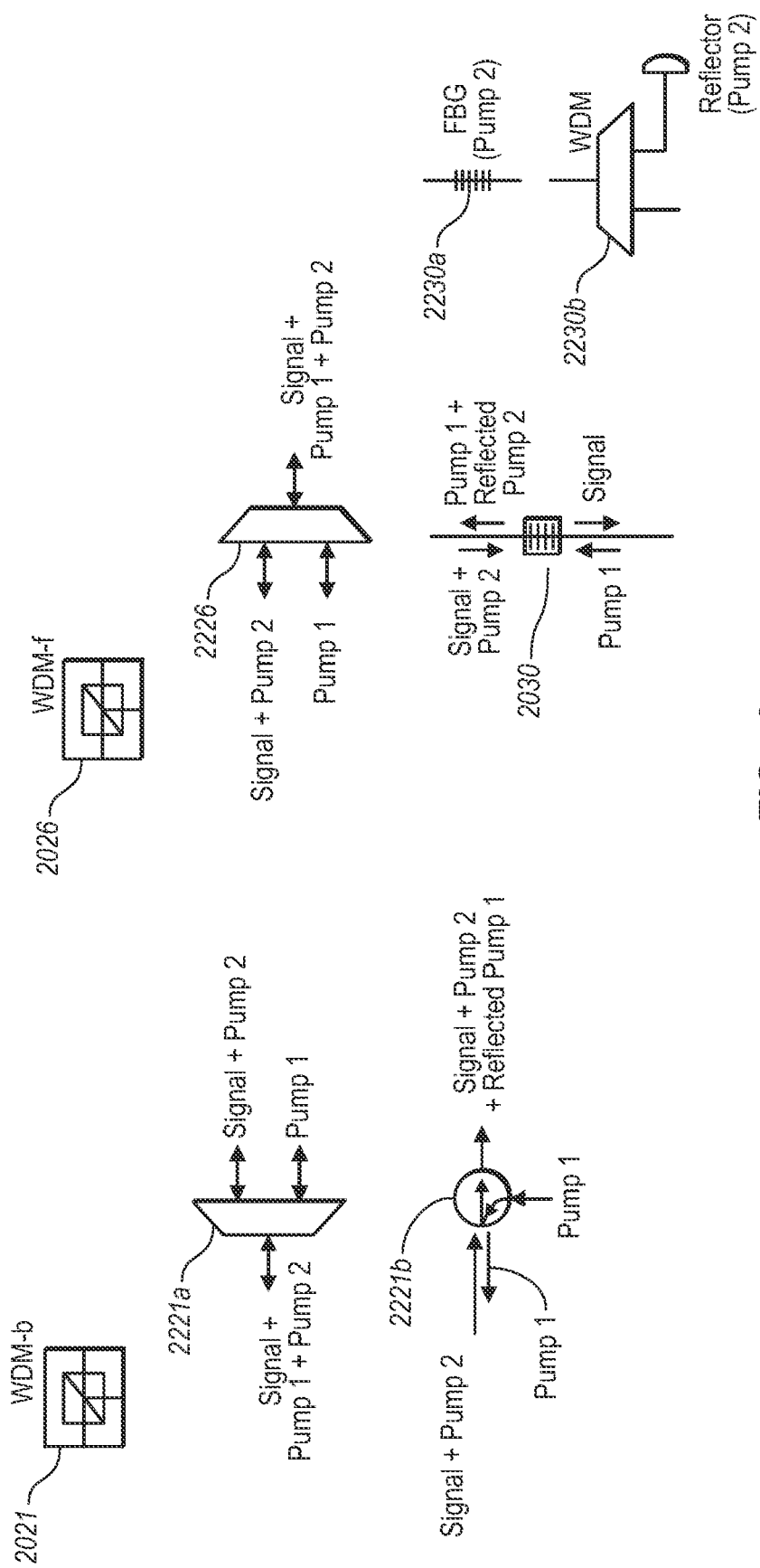

FIG. 6 depicts some example embodiments of WDM-b function 2021, WDM-f function 2026, and pump reflector function 2030 of FIG. 4. WDM-b function 2021 combines and/or separates pump1, of one or more pump wavelengths, with/from signal, of one or more signal wavelengths, and with/from pump2, of zero or more pump wavelengths. WDM-b function 2021 may comprise WDM 2221a and/or circulator 2221b. If circulator 2221b is used as WDM-b function 2021, then in some embodiments it must be the last WDM function in WDM-b with respect to the signal direction 2001 of FIG. 4 since it does not allow any pumps to be transmitted in the backward direction (i.e., it will terminate any pumps traveling backward into the circulator). WDM-f function 2026 combines and/or separates pump1, of one or more pump wavelengths, with/from signal, of one or more signal wavelengths, and with/from pump2, of zero or more pump wavelengths. WDM-f function 2026 may comprise WDM 2226. In certain embodiments, pump reflect function 2030 transmits pump1, of zero or more pump wavelengths, in a first direction; reflects pump2, of one or more pump wavelengths, traveling from a second direction back into the first direction; and transmits signal, of zero or more signal wavelengths, traveling in either direction. Pump reflect function 2030 may comprise a fiber Bragg grating 2030a reflective at pump2 wavelength(s), a WDM similar to 2221a, and a broadband reflector 2230b. It is understood that any combination of components known to those skilled in the art may be combined to perform pump reflect function 2030.

Figure 7:
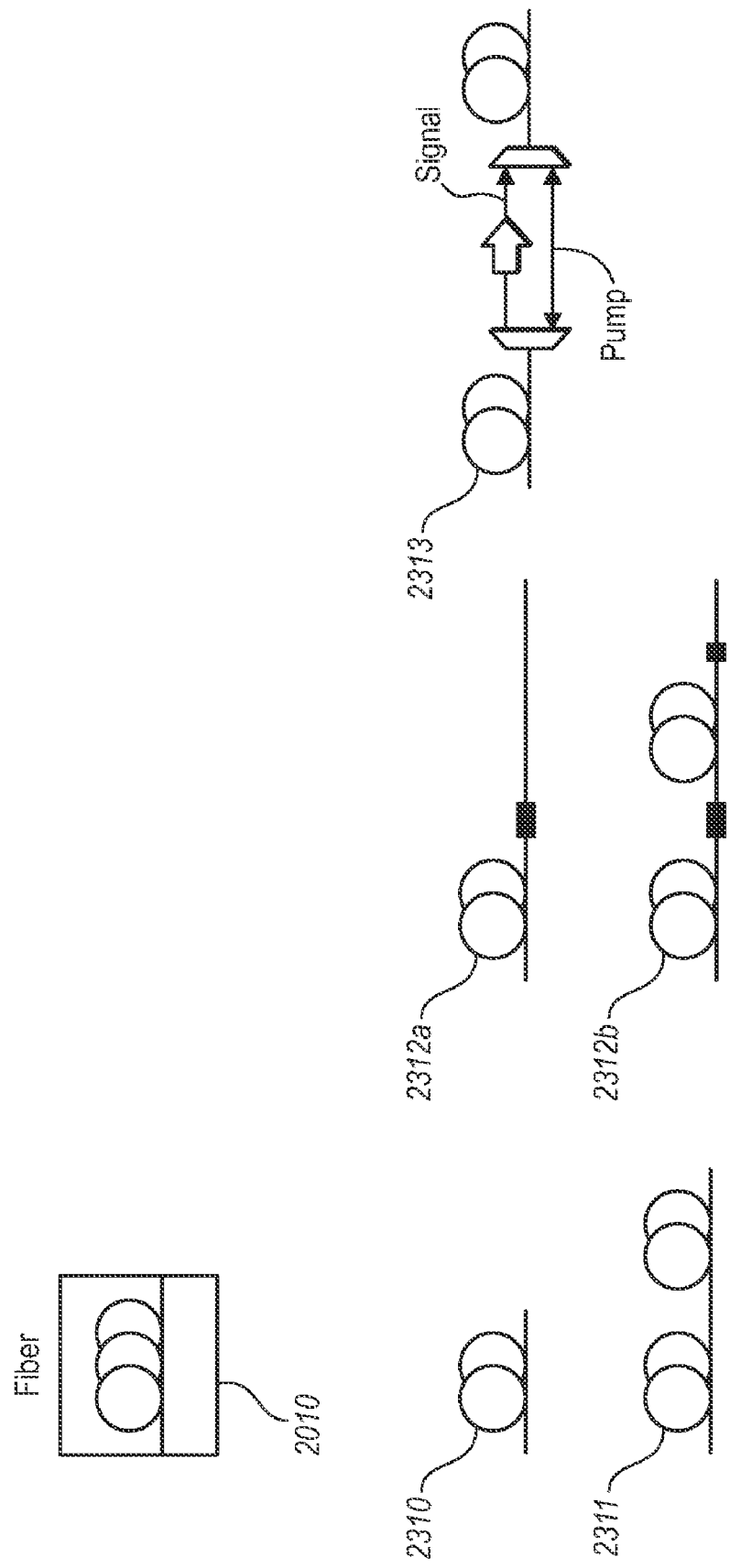

FIG. 7 depicts some example embodiments of fiber unit 2010 of FIG. 4. Fiber unit 2010 comprises one or more fiber sections capable of providing gain when one or more pump wavelengths travel in any direction at least part of the way through the fiber section; each section may comprise one or more fiber types and/or lengths. Fiber unit 2010 may comprise, for example, Raman gain fiber, dispersion-compensation fiber, rare-earth-doped fiber (such as erbium-doped or thulium-doped fiber), and/or transmission (or "line") fiber (examples of which are standard single mode fiber (SMF), dispersion shifted fiber (DSF), non-zero dispersion shifted fiber (NZDSF), dispersion compensating fiber (DCF), and pure-silica core fiber (PSCF)). Fiber sections of fiber unit 2010 may comprise discrete fiber spools, hybrid fiber spools, and/or cabled transmission fiber used for optical communication. Examples of fiber unit 2010 are shown in FIG. 7: a single section of fiber 2310; multiple sections of possibly dissimilar fiber 2311; and/or combinations of fiber sections and connectorized fiber spools 2312 which may be added (2312b) or removed (2312a). In addition, fiber unit 2010 may comprise other optical components such as isolators and/or WDMs. It may be beneficial, in certain embodiments, to place such optical components between two or more sections of fiber. An example 2313 of this is to place an isolator between spools with a WDM on each side of the isolator to allow pump, of one or more wavelengths, to bypass the isolator and travel in either direction, but allow signal, of one or more wavelengths, to travel in only one direction. One advantage of 2313 is that pump may travel from right to left through both fiber sections while signal may only travel from left to right. One advantage of this may be lower multiple-path interference in the signal wavelength range and another advantage may be that amplified spontaneous emission from the right fiber section does not travel into the left fiber section.

Figure 8A:
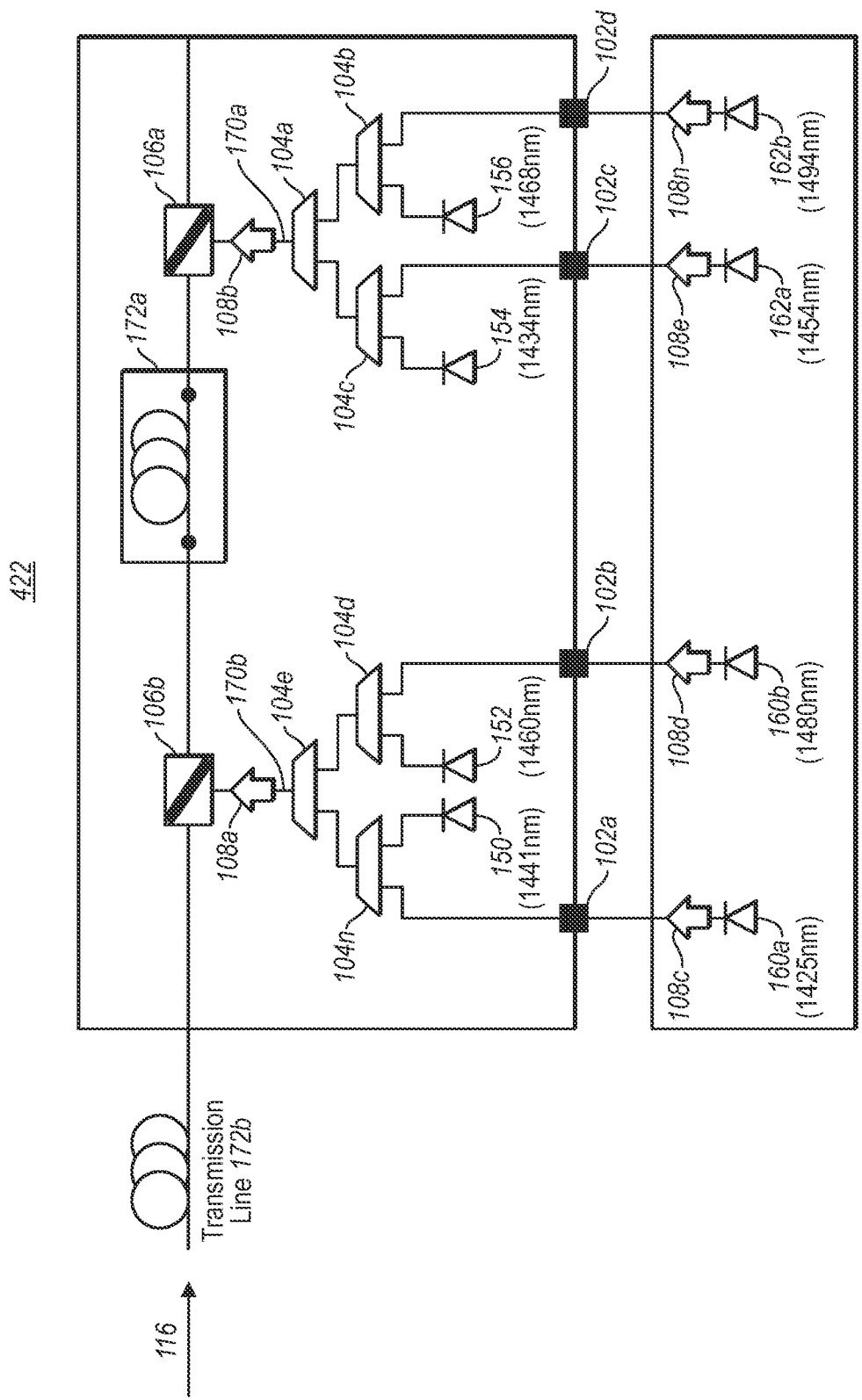
FIG. 8a illustrates a block diagram of one example of a modular optical amplifier capable of having its bandwidth expanded.

FIG. 8a illustrates a block diagram of one example of a modular optical amplifier 422 capable of having its bandwidth expanded. In various embodiments, the structure and function of optical amplifier 422 can be substantially similar to the structure and function of amplifiers 18, 22, and/or 24 of FIG. 1. In this example, initial bandwidth (B1 in FIGS. 2 and 3) is approximately 1543.33 to 1567.13 nm and expanded bandwidth (B2 in FIGS. 2 and 3) is approximately 1567.54 to 1592.10 nm. Amplifier 422 includes original pump sources 150, 152, 154, and 156 capable of generating pump wavelengths at 1441 nm, 1460, nm, 1434 nm, and 1468 nm, respectively. Although each of pump sources 150, 152, 154, and 156 generate particular pump wavelengths in this example, other pump wavelengths can be used without departing from the scope of the present disclosure. In addition, although each of pump sources 150, 152, 154, and 156 generate one pump wavelength in this example, pump sources 150, 152, 154, and 156 can generate one or more pump wavelengths without departing from the scope of the present disclosure. Pump sources 150, 152, 154, and 156 can comprise any device or combination of devices capable of generating one or more pump wavelengths at desired power levels and wavelengths. For example, pump sources 150, 152, 154, and 156 may comprise a depolarizer, a polarization division multiplexer (PDM) with two orthogonally polarized pumps, a solid state laser, such a Nd:YAG or Nd:YLF laser, a semiconductor laser, a laser diode, a cladding pump fiber laser, or any combination of these or other light sources. In this particular embodiment, pump source 150, 152, 154, and 156 comprise laser diodes with PDM or depolarizer.

Amplifier 422 also includes combiners 104a-104n operable to receive the pumps generated by pump sources 150, 152, 154, and 156, and to combine those pumps into multiple wavelength pump 170. As one particular example, combiners 104 could comprise a wavelength division multiplexer (WDM). In this example, amplifier 422 also includes couplers 106a and 106b operable to couple pumps 170a and 170b, respectively, to a gain medium 172. In this example, pumps 170 counter-propagate through gain media 172 with respect to optical signal direction 116. Although pumps 170 counter-propagate through gain media 172 in this example, one or more of the pump wavelengths of pumps 170 could co-propagate through gain media 172 without departing from the scope of the present disclosure.

To expand the bandwidth of amplifier 422, new pump sources 160 and 162 are added to amplifier 422. In this example, new pump sources 160a introduce a pump wavelength at 1425 nm, pump sources 160b introduce a pump wavelength at 1480 nm, pump sources 162a introduce a pump wavelength at 1454 nm, and pump sources 162b introduce a pump wavelength at 1494 nm. Although each of pump sources 160 and 162 generate particular pump wavelengths in this example, other pump wavelengths can be used without departing from the scope of the present disclosure. In addition, although each of pump sources 160 and 162 generate one pump wavelength in this example, pump sources 160 and 162 can generate one or more pump wavelengths without departing from the scope of the present disclosure. The structure and function of pump sources 160 and 162 can be substantially similar to the structure and function of pump sources 150-156.

In this particular embodiment, new pump wavelengths from pump sources 160 are combined with the pump wavelengths of pump sources 150 and 152 to broaden the distributed Raman amplification bandwidth in transmission line 172b of amplifier 422. In addition, new pump wavelengths from pump sources 162 are combined with the pump wavelengths of pump sources 154 and 156 to broaden discrete Raman amplification bandwidth in discrete fiber 172a of amplifier 422. In addition, pumps may be passed through pump isolators 108a-108n. Pump isolators may be used to prevent pump cross-talk or instabilities through feedback.

Figure 8B:
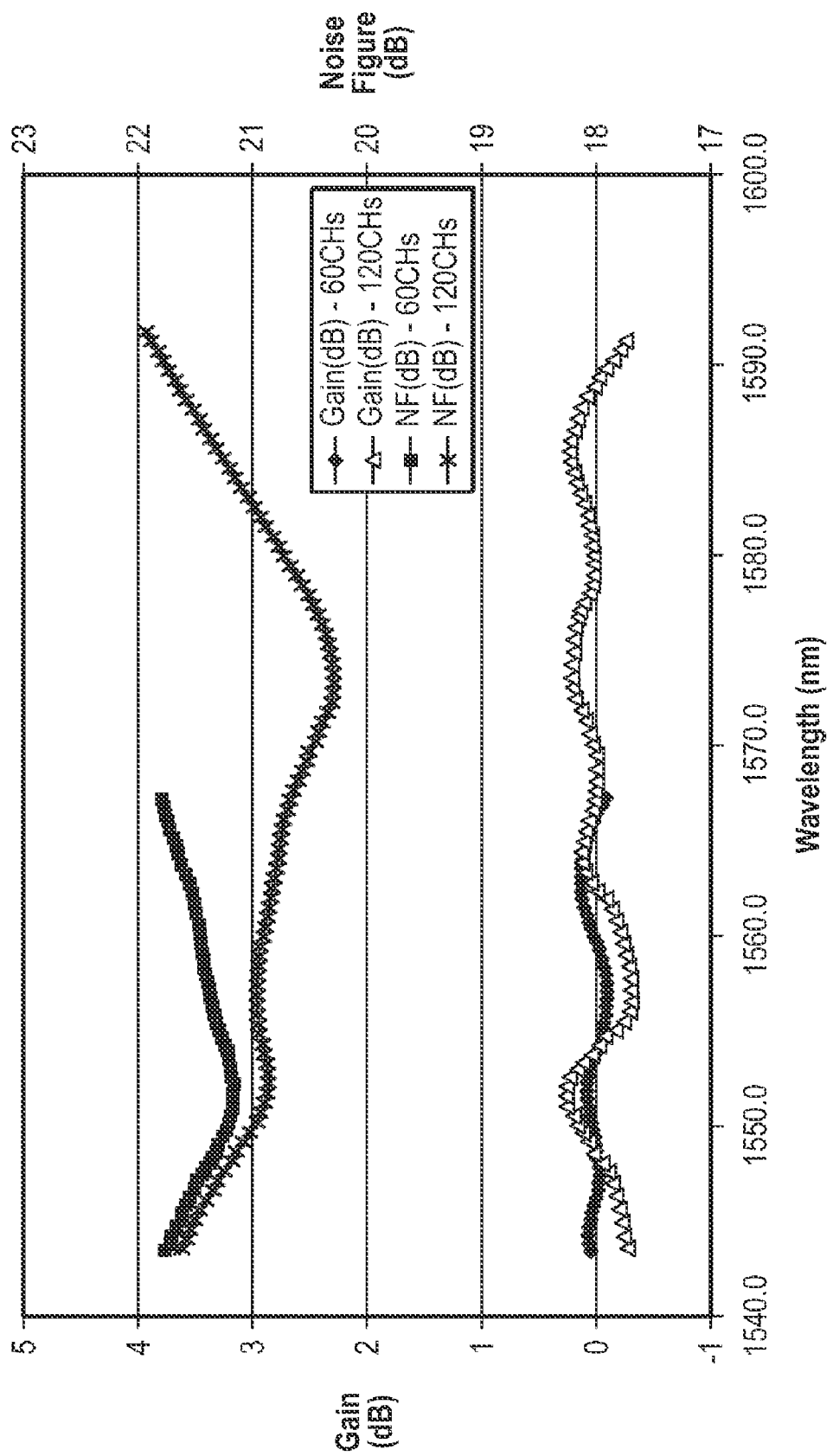
FIG. 8b shows example gain and noise figure characteristics of bandwidth expansion of the example amplifier of FIG. 8a including a transmission fiber.

FIG. 8b shows example gain and noise figure characteristics of bandwidth expansion of the example amplifier of FIG.

8a including an 80-km transmission fiber. The original (before expansion) gain and noise figure are shown for amplification of 60 channels. The gain and noise figure are also shown for the expanded 120-channel amplification which has similar gain, gain ripple, and noise figure as the 60-chan case.

Figure 9:
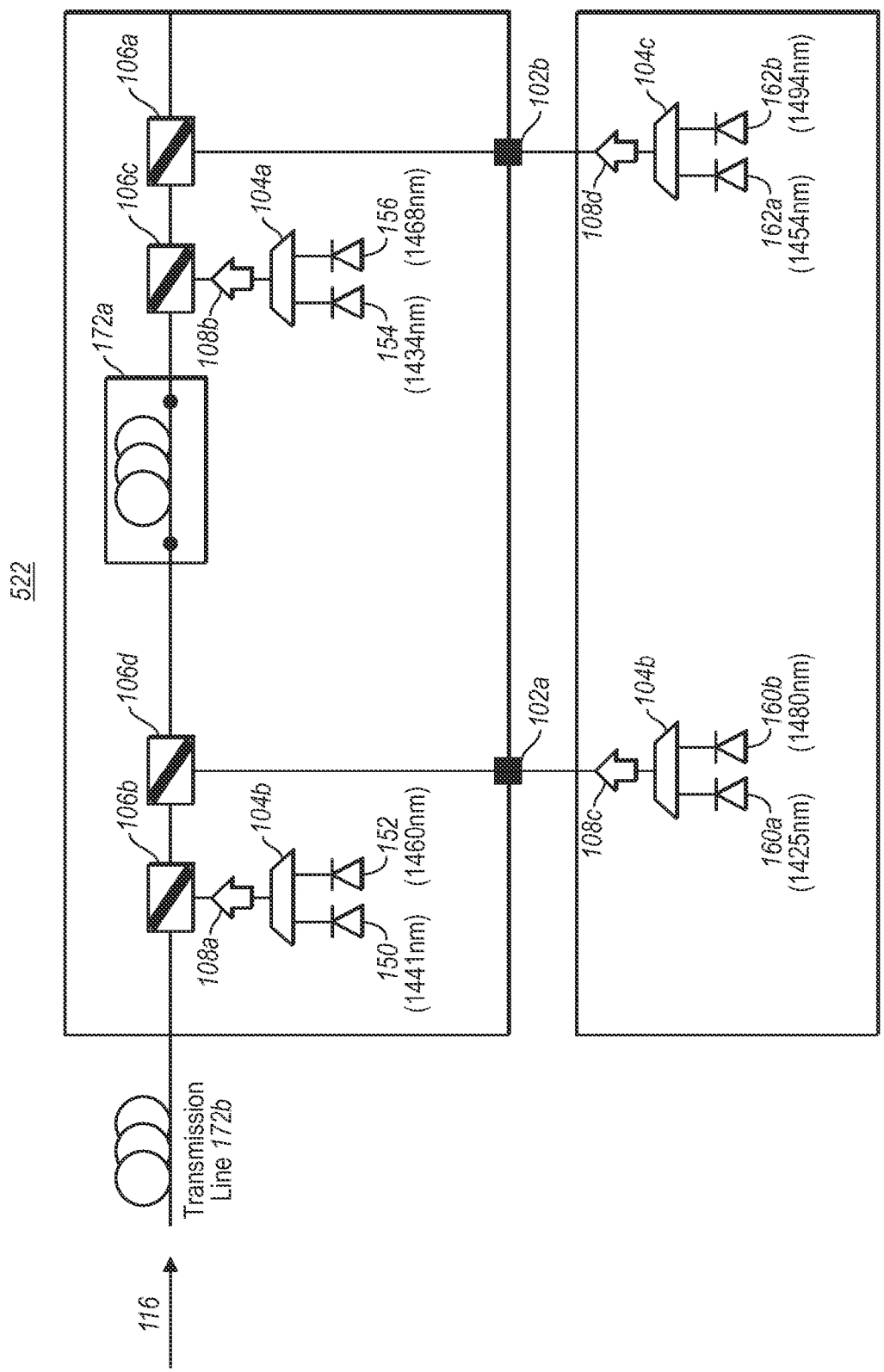
FIG. 9 is a block diagram of one example of a modular optical amplifier capable of having its bandwidth expanded.

FIG. 9 is a block diagram of one example of a modular optical amplifier 522 capable of having its bandwidth expanded. Amplifier 522 is similar in function to amplifier 422 of FIG. 8a. However, the pump wavelengths used in this and in other figures in this disclosure are examples only; other pump wavelength values may be used in any of the various embodiments. The design in FIG. 9 uses additional multiplexers 106 in the implementation of the design, but uses a fewer number of pump connectors 102 and pump isolators 108. Initial and expansion pump wavelength signals pass through one or more ports 102 and/or one or more pump multiplexers (mux) 104. As with other designs, expansion pump wavelengths can be placed above, below, or in between the initial pump wavelengths.

Figure 10:
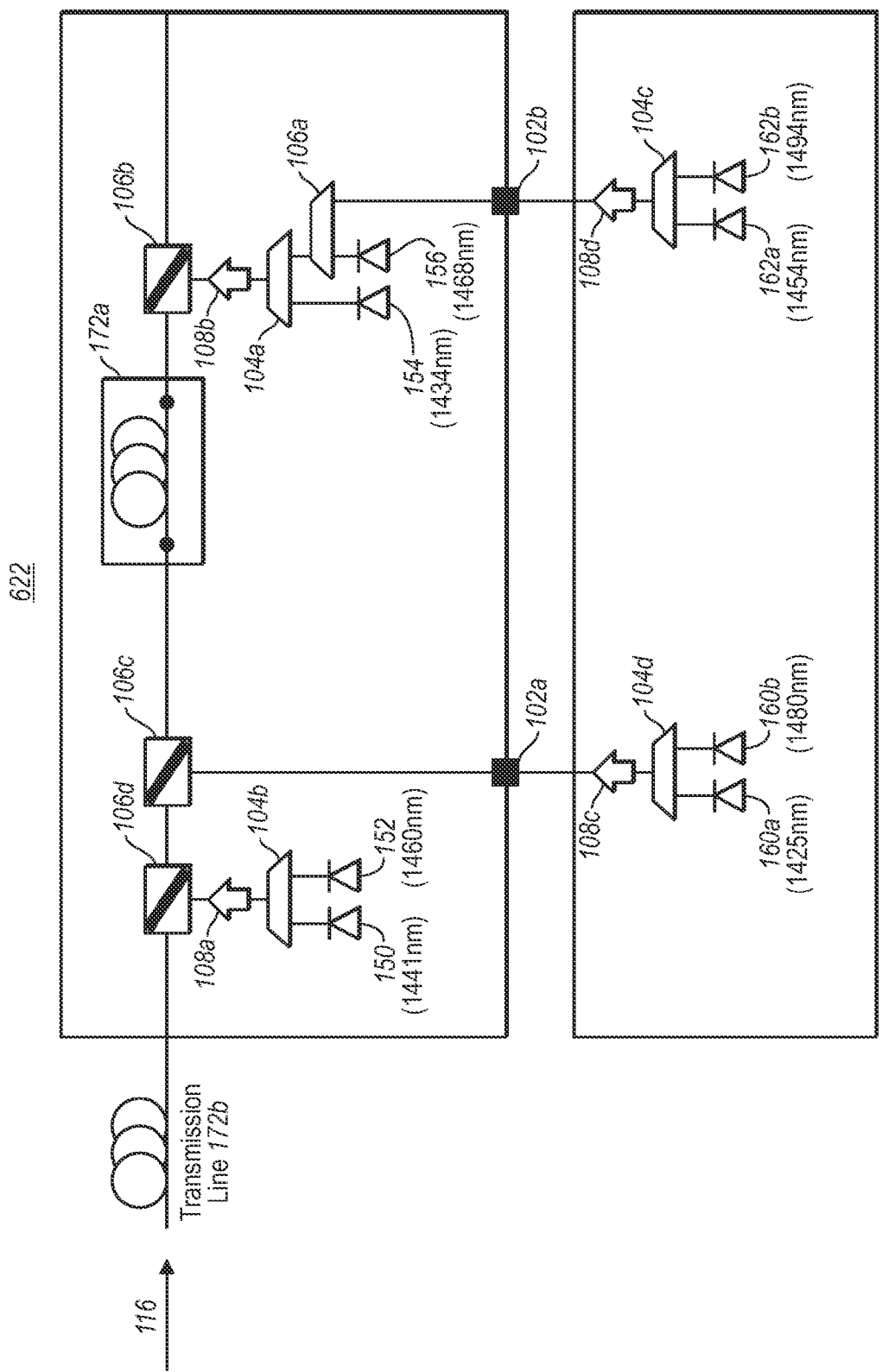
FIG. 10 is a block diagram of one example of a modular optical amplifier capable of having its bandwidth expanded.

FIG. 10 is a block diagram of one example of a modular optical amplifier 622 capable of having its bandwidth expanded. Amplifier 622 is similar in function to amplifier 422 of FIG. 8a. Initial and/or expansion pumps may pass through pump muxes 104, isolators 108, ports 102, and/or multiplexers 106. In addition, in certain embodiments a pump mux like mux 106a may be used to combine two or more pumps, which provides less component loss for the signal path than multiplexer 106a of FIG. 9.

Figure 11A:
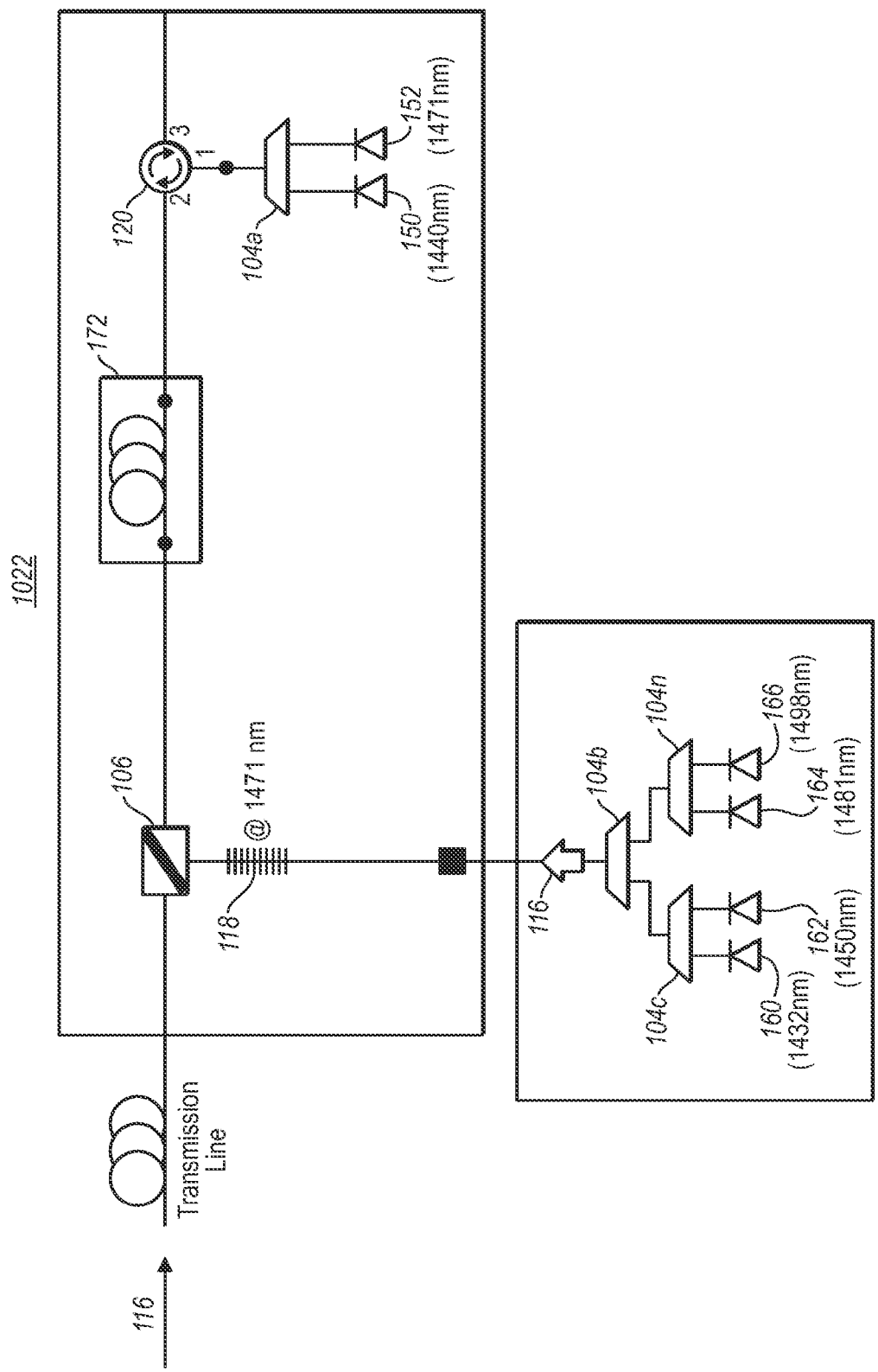
FIG. 11a is a block diagram of one example of a discrete modular optical amplifier capable of having its bandwidth expanded.

FIG. 11a is a block diagram of one example of a discrete modular optical amplifier 1022 capable of having its bandwidth expanded by adding the new pump wavelengths on the opposite side of the gain spool relative to the original pump. One benefit of this example is two pump multiplexer sections, which are not dependent on each other, allowing more flexibility in wavelength selection and reducing the number of couplers 104 in the core amplifier. Amplifier 1022 is similar in function to amplifier 422 of FIG. 8a. In this example, the initial bandwidth is approximately 1543.33 to 1567.13 nm and the expanded bandwidth is approximately 1531.51 to 1542.94 nm and 1567.54 to 1592.10 nm. Amplifier 1022 includes original pump sources 150 and 152 capable of generating pump wavelengths at 1440 nm and 1471 nm, respectively. Although each of the pump sources 150 and 152 generate particular pump wavelengths in this example, other pump wavelengths can be used without departing from the scope of the present disclosure.

When bandwidth expansion is desired, pump wavelengths 160, 162, 164 and 166 can be added. In this example 160, 162, 164 and 166 introduce pump wavelengths at 1432 nm, 1450 nm, 1481 nm and 1498 nm, respectively. Original and/or new pump wavelengths may pass through one or more couplers 104, isolators 116, and multiplexers 106. In this and other embodiments, one or more pump reflectors 118 may be used to reflect one or more pump wavelengths of the pump in one direction and direct it to the opposite direction. Optical circulators 120 are non-reciprocal devices that redirect light from port to port sequentially in only one direction. In particular, pump from port 1 is directed to port 2 in the backward direction in this example, pump and/or signal entering port 2 transmit to port 3 in the forward direction in this example, but ports 2 to 1 and 3 to 1 are isolated. Optical circulators are 3-port coupling devices that are made to be polarization independent and have low insertion loss.

Figure 11B:
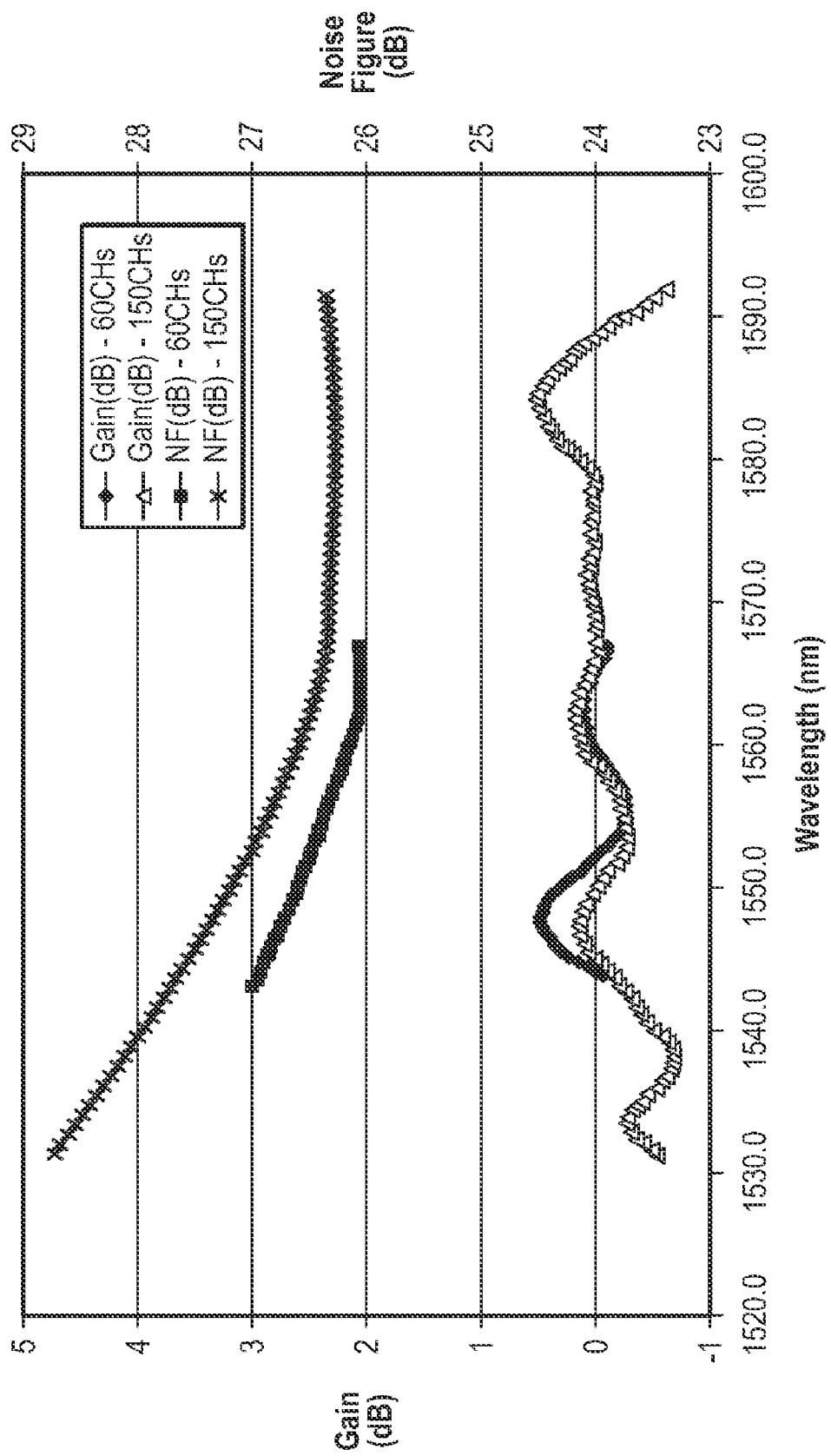
FIG. 11b shows example gain and noise figure characteristics of bandwidth expansion of the example amplifier of FIG. 11a including a transmission fiber.

FIG. 11b shows example gain and noise figure characteristics of bandwidth expansion of the example amplifier of FIG. 11a including an 80-km transmission fiber. The original (before expansion) gain and noise figure are shown for amplification of 60 channels. The gain and noise figure are also shown for the expanded 150-channel amplification which has similar gain, gain ripple, and noise figure as the 60-chan case.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An optical amplifier comprising:
   a gain medium of an optical amplifier, the gain medium adapted to receive a first optical signal comprising a first plurality of optical signal wavelengths;
   a first pump source coupled to the gain medium during a first period and adapted to introduce at least a first pump comprising one or more first pump wavelengths to the gain medium, wherein the first pump amplifies the first optical signal during the first period; and
   a second pump source coupled to the gain medium at a second period that is later in time than the first period, the second pump source adapted to introduce at least a second pump comprising one or more second pump wavelengths to the gain medium such that both the first pump source and the second pump source are coupled to the gain medium during the second period, at least one of the one or more second pump wavelengths being different than any of the one or more first pump wavelengths, the second pump at least assisting in the amplification of a second optical signal during the second period, the second optical signal comprising a second plurality of optical signal wavelengths, at least one of the second plurality of optical signal wavelengths being different than all of the first plurality of optical signal wavelengths such that the second pump source assists the first pump source in expanding bandwidth of the optical amplifier in the second period as compared to the first period during which the first pump source operates without the second pump source.

2. The optical amplifier of claim 1,
   wherein at least one of the second pump wavelengths is shorter than a longest wavelength of the one or more first pump wavelengths,
   wherein at least one of the second plurality of optical signal wavelengths is longer than a longest wavelength of the first plurality of optical signal wavelengths.

3. The optical amplifier of claim 2, wherein the gain medium comprises a Raman gain medium.

4. The optical amplifier of claim 3, wherein at least one of the one or more second pump wavelengths is longer than a shortest wavelength of the one or more first pump wavelengths.

5. The optical amplifier of claim 3, wherein at least one of the one or more second pump wavelengths counter-propagates relative to at least one of the one or more first pump wavelengths.

6. The optical amplifier of claim 3, wherein at least one of the one or more second pump wavelengths co-propagates relative to at least one of the one or more first pump wavelengths.

7. The optical amplifier of claim 3, further comprising:
   a first multiplexer that is in the path of the signal and that receives as one of the inputs a possible input path of the first pump; and a second multiplexer that is in the path of the signal and that receives as one of the inputs a possible input path of the second pump.

8. The optical amplifier of claim 3, further comprising:
a first multiplexer that combines a possible input path of the second pump into a possible input path of the first pump to form a combined possible input path of the first pump and the second pump; and
a second multiplexer that is in a path of the signal and that receives as one of the inputs the combined possible input path of the first pump and the second pump.

9. The optical amplifier of claim 3, further comprising:
an optical connector that is configured to couple a possible input path of the second pump into the gain medium.

10. The optical amplifier of claim 1,
wherein at least one of the second pump wavelengths is longer than a shortest wavelength of the one or more first pump wavelengths, and
wherein at least one of the second plurality of optical signal wavelengths is shorter than a shortest wavelength of the first plurality of optical signal wavelengths.

11. The optical amplifier of claim 10, wherein the gain medium comprises a Raman gain medium.

12. The optical amplifier of claim 11, wherein at least one of the second pump wavelengths is shorter than a longest wavelength of the one or more first pump wavelengths.

13. The optical amplifier of claim 11, wherein at least one of the one or more second pump wavelengths counter-propagates relative to at least one of the one or more first pump wavelengths.

14. The optical amplifier of claim 11, wherein at least one of the one or more second pump wavelengths co-propagates relative to at least one of the one or more first pump wavelengths.

15. A method for optical amplifying optical signals, the method comprising:
providing a first optical signal comprising a first plurality of optical signal wavelengths into a gain medium of an optical amplifier during a first period;
providing a first pump comprising one or more first pump wavelengths into the gain medium during the first period to thereby amplify the first optical signal in the gain medium during the first period;
coupling a second pump source to the gain medium before a second period that is later in time than the first period such that the second pump source may provide a second pump into the gain medium such that both the first pump source and the second pump source are coupled to the gain medium during the second period, the second pump comprising one or more second pump wavelengths; and
using the second pump source to provide the second pump into the gain medium during the second period, wherein at least one of the one or more second pump wavelengths is different than any of the one or more first pump wavelengths, the second pump at least assisting in the amplification of a second optical signal during the second period, the second optical signal comprising a second plurality of optical signal wavelengths, at least one of the second plurality of optical signal wavelengths being different than all of the first plurality of optical signal wavelengths such that the second pump source assists the first pump source in expanding bandwidth of the optical amplifier in the second period as compared to the first period during which the first pump source operates without the second pump source.

16. The method of claim 15,
wherein at least one of the second pump wavelengths is shorter than a longest wavelength of the one or more first pump wavelengths,
wherein at least one of the second plurality of optical signal wavelengths is longer than a longest wavelength of the first plurality of optical signal wavelengths.

17. The method of claim 16, wherein the gain medium comprises a Raman gain medium such that the first and second pumps assist in the Raman amplification.

18. The method of claim 17, wherein at least one of the one or more second pump wavelengths is longer than a shortest wavelength of the one or more first pump wavelengths.

19. The method of claim 17, wherein at least one of the one or more second pump wavelengths counter-propagates relative to at least one of the one or more first pump wavelengths.

20. The method of claim 17, wherein at least one of the one or more second pump wavelengths co-propagates relative to at least one of the one or more first pump wavelengths.

21. The method of claim 17,
wherein the act of providing a first pump into the gain medium is performed by providing the first pump along a possible path to a first multiplexer that is in a path of the signal, and
wherein the act of providing a second pump into the gain medium is performed by providing the second pump along a possible path to a second multiplexer that is also in the path of the signal.

22. The method of claim 17,
wherein the act of providing a first pump into the gain medium is performed by providing the first pump along a possible path of the first pump to a first multiplexer that is in a path of the signal, and
wherein the act of providing a second pump into the gain medium is performed by providing the second pump along a possible path to a second multiplexer that combines the second pump into a possible path of the first pump.

23. The method of claim 17,
wherein the act of providing a second pump into the gain medium is performed using an optical connector that may be connected after the first period.

* * * * *